United States Patent [19]

McFarland

[11] 3,990,478
[45] Nov. 9, 1976

[54] COMBINED STRENGTHENING AND CORROSION PROTECTION OF PIPELINES

[75] Inventor: William H. McFarland, Merrillville, Ind.

[73] Assignee: Inland Steel Company, Chicago, Ill.

[22] Filed: Nov. 20, 1974

[21] Appl. No.: 525,353

[52] U.S. Cl. .............................. 138/103; 138/134; 138/139; 138/DIG. 6; 138/110; 138/150; 174/108; 174/126 CP
[51] Int. Cl.² .................................... F16L 58/00
[58] Field of Search ........... 138/134, 140, 143, 144, 138/149, 150, 172, 176, 139, 103, 110, DIG. 5, DIG. 6; 174/108, 126 CP, 109; 204/196, 197; 307/95

[56] References Cited
UNITED STATES PATENTS

| | | | |
|---|---|---|---|
| 661,165 | 11/1900 | Blake | 138/DIG. 6 |
| 1,310,715 | 7/1919 | Rose et al. | 138/DIG. 6 |
| 1,690,580 | 11/1928 | Hedley et al. | 138/134 X |
| 1,871,125 | 8/1932 | McGary et al. | 138/150 X |
| 2,047,778 | 7/1936 | Hayden | 138/149 X |
| 2,158,771 | 5/1939 | Beckwith | 138/DIG. 6 |
| 2,168,067 | 8/1939 | Jones | 138/134 |
| 2,237,321 | 4/1941 | Wesley | 138/DIG. 6 |
| 2,303,778 | 12/1942 | Wesley | 204/197 X |
| 2,311,138 | 2/1943 | Swartz | 138/143 X |
| 2,491,225 | 12/1949 | Stearns | 204/196 X |
| 3,259,148 | 7/1966 | Krengel et al. | 138/145 |
| 3,260,661 | 7/1966 | Kemp et al. | 204/148 |
| 3,354,063 | 11/1967 | Shutt | 204/197 X |
| 3,490,497 | 8/1966 | Kennedy | 204/197 X |
| 3,880,195 | 4/1975 | Goodrich et al. | 138/DIG. 5 X |
| 3,910,315 | 10/1975 | Norteman | 138/DIG. 6 X |

FOREIGN PATENTS OR APPLICATIONS

| | | | |
|---|---|---|---|
| 1,149,947 | 7/1957 | France | 204/148 |

OTHER PUBLICATIONS

"Control of Pipeline Corrosion", Peabody, 1969 *Appalachian Underground Corrosion* Short Course (National Association of Corrosion Engineers), pp. 5, 8, 14–17 & 20–21.
"Cathodic Corrosion of Cable Sheaths", Halpepin, 1943 The Electrochemical, preprint 87–1.

Primary Examiner—Richard E. Aegerter
Assistant Examiner—James E. Bryant, III
Attorney, Agent, or Firm—Hibben, Noyes & Bicknell

[57] ABSTRACT

Combined strengthening and corrosion protection of a ferrous metal pipeline is obtained by means of a wrap of ferrous metal strip, the strip being coated with a less noble metal, such as zinc or aluminum or a zinc alloy or an aluminum alloy, and the strip being under sufficient tension to strengthen and reinforce the pipe or to arrest fracture propagation. The less noble metal coating of the strip is electrically connected to the pipe to provide cathodic protection for the pipe. A coating of electrically insulating material may be interposed between the pipe and the wrap. An external power source may be utilized for primary cathodic protection in which case the coated strip is relied upon as a secondary or back-up system.

20 Claims, 2 Drawing Figures

U.S. Patent  Nov. 9, 1976  3,990,478
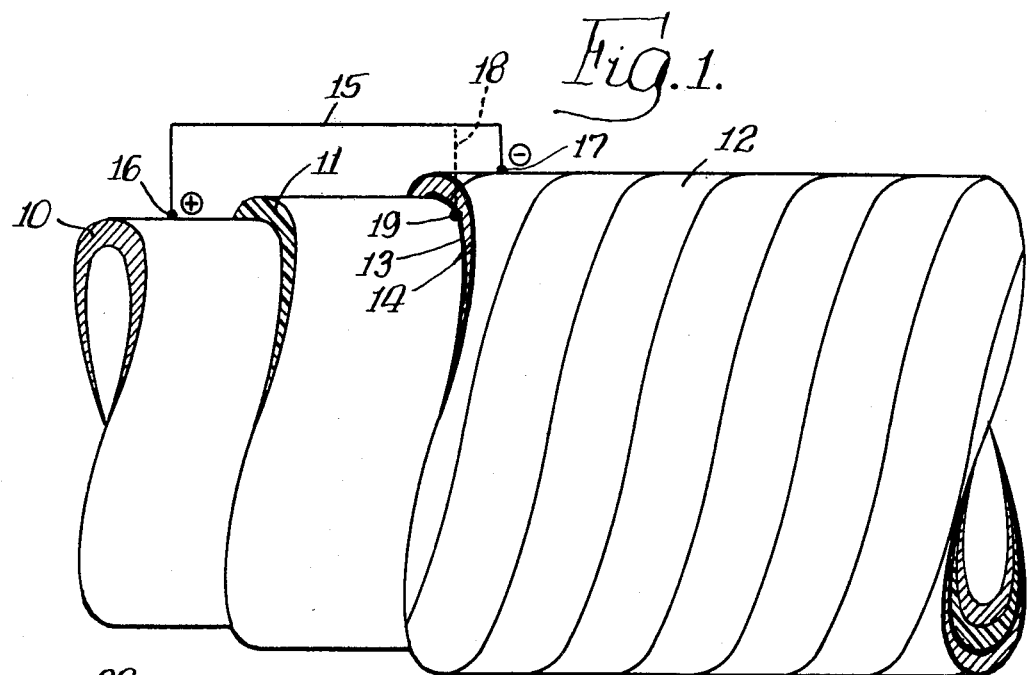
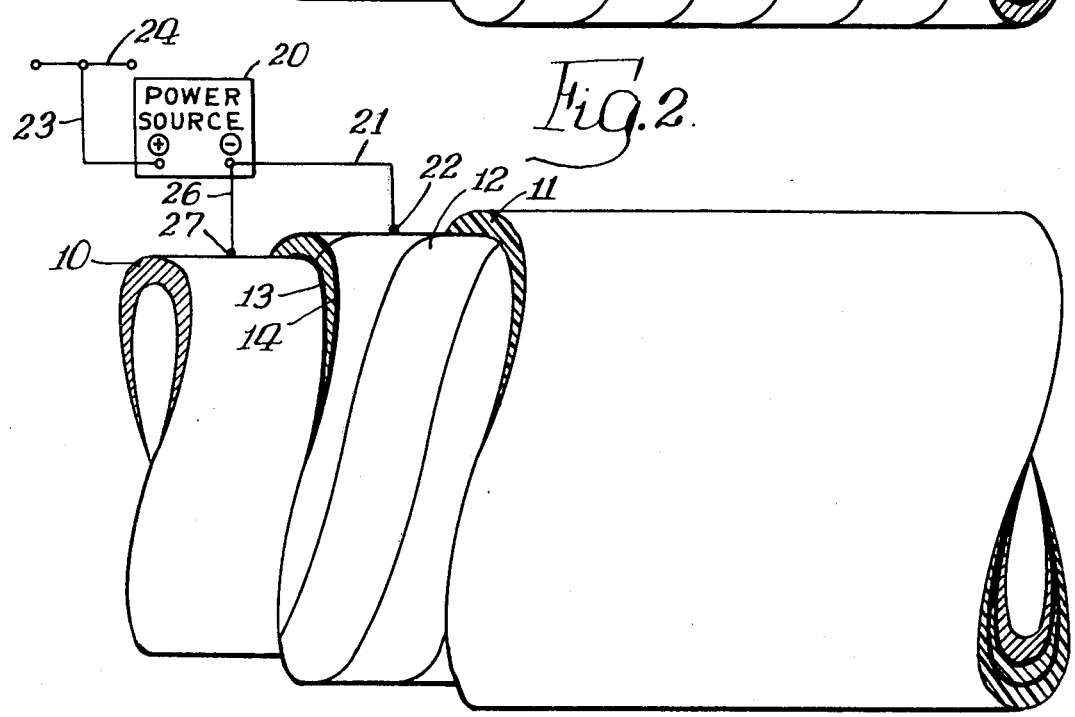

COMBINED STRENGTHENING AND CORROSION PROTECTION OF PIPELINES

This invention relates to improvements in corrosion protection of ferrous metal pipelines and more particularly to a novel and improved means for providing combined strengthening and corrosion protection for steel pipelines.

Corrosion of underground water, oil, and gas pipelines is a serious problem requiring substantial expenditures for protection systems, maintenance, and replacement. Dependent upon the pipeline material and the physical and chemical compositoin of the soil, such corrosion is frequently ascribed to galvanic action in which corrosion current flows from anodic areas on the ferrous metal pipe through the surrounding soil, which acts as an electrolyte, to cathodic areas on the pipe. Where the current leaves the anodic areas, corrosion of the pipe occurs.

Several systems of corrosion protection for steel pipelines have been employed heretofore. One such system involves the application of a suitable non-metallic protective coating of electrically insulating material to the exterior of the pipeline. The function of such a coating is to isolate the metal of pipeline from the surrounding electrolyte (i.e. the soil), thereby interposing a high electrical resistance in the anodecathode circuit so that no significant corrosion current flows from the anodic areas to the cathodic areas of the pipe. Another corrosion control system which has been widely used is external cathodic protection in which direct current is introduced into the soil surrounding the pipeline to oppose the discharge of a corrosion current from anodic areas of the pipe, whereby the entire exposed exterior surface of the pipe becomes a single cathodic area. The required current may be provided by impressing a voltage from an outside electric power system on the circuit between the pipeline and a ground bed in the soil comprising buried electrodes of graphite, carbon, non-corrodible alloys, platinum or the like. Alternatively, the current may be generated in the soil by means of galvanic anodes of a less noble or electronegative metal (e.g. zinc, aluminum or magnesium) buried in the soil and electrically connected to the ferrous metal pipeline which then becomes the cathode of a galvanic couple. In the latter case, the galvanic anode corrodes as current is discharged to the pipeline, and this method is normally used where only a relatively small current is required for protection.

Although under some conditions external cathodic protection may be employed successfully with a bare or uncoated pipeline, maximum corrosion protection can be realized by the combined use of the coating system and the cathodic protection system, and the combination system is therefore preferred. In such case, the external cathodic protection system serves to protect the exposed steel at the small number of unavoidable defects or "holidays" in the coating.

The cathodic protection systems heretofore used have been generally successful but have certain inherent disadvantages. The use of impressed current from an external power supply requires costly generators and rectifiers. The use of less noble metal anodes buried in the ground provides only limited current output, requires careful installation of the anodes, and is subject to the varying effects of soil resistivity and other soil characteristics.

Accordingly, it is a primary object of the present invention to provide a novel and improved cathodic protection system for ferrous metal pipelines, particularly large diameter steel pipelines operated at high pressures.

A more specific object of the invention is to provide a novel and improved means of utilizing a less noble metal, such as zinc or aluminum or alloys thereof, for cathodic protection of ferrous metal pipelines.

A further object of the invention is to provide a novel means of providing combined strengthening and cathodic protection for ferrous metal pipelines, particularly large diameter steel pipelines operated at high pressures.

Other objects and advantages of the invention will be apparent from the subsequent detailed description in conjunction with the accompanying drawing, wherein:

FIG. 1 is a schematic diagram illustrating one specific embodiment of the invention; and FIG. 2 is a schematic diagram showing another embodiment of the invention.

Briefly, described, the present invention in its broadcast aspect contemplates a prestressed ferrous metal or steel pipeline having at least one layer of an external helical wrapping of high tensile strength ferrous metal or steel strip coated with a metal less noble than iron, such as zinc or aluminum or an alloy of zinc or an alloy of aluminum, the strip being under sufficient tension to strengthen and reinforce the pipe or to arrest fracture propagation, and the less noble metal coating of the strip being electrically connected to the pipe so as to provide cathodic protection for the pipe. In accordance with well-known electrochemical principles, the less noble metal coating on the strip corrodes sacrificially in use, thereby protecting the ferrous metal or steel pipeline as well as the ferrous metal or steel strip. The extent or severity of the galvanic corrosion depends not only on the difference in potential of the two metals but also upon the relative surface areas involved. The present invention provides a very convenient and economical means of obtaining a high anodic area compared with the cathodic area so that the galvanic corrosion rate of the anode metal is minimized. In addition, by placing the wrapping strip under sufficient tension, the pipeline is effectively strengthened and reinforced or fracture propagation is effectively arrested.

Referring to FIG. 1, a section of steel pipeline 10 has adhered to its exterior surface a coating 11 of electrically insulating material which preferably is one of the hot-applied coal tar or asphalt type coatings which in the pipeline industry are referred to as "enamels". However, mastics, cold applied liquid coatings, tapes, and plastic coatings may also be used, as described more fully in "Control of Pipeline Corrosion" by A. W. Peabody (National Association of Corrosion Engineers), pages 14–16. The coating 11 may be applied by any conventional technique, including the use of high tensile strength reinforced tapes combined with the "enamel" or other insulating material. A high tensile strength steel strip or strap 12 coated with a less noble metal, particularly zinc, aluminum or an alloy thereof, is helically wound over the coated pipe. For convenience of illustration, the zinc or aluminum or zinc alloy or aluminum alloy coatings on the inner and outer surfaces of the strip are designated schematically at 13 and 14, respectively. To complete the circuit required for galvanic protection, one end of an electrical conductor or wire 15 has an electrical connection 16 with the pipe 10, and the other end of the conductor 15 is electrically connected at 17 to the outer coating layer 14 of the strip 12. If desired, the inner coating layer 13 can also be connected in the cathodic protection circuit by a conductor 18 extending from the conductor 15 to an electrical connection 19 at the inner coated surface of the strip 12. It will be understood that the pipeline in use is buried in the soil, although not so illustrated in FIG. 1.

Although the coating 11 protects the bulk of the outer surface area of the pipe 10, the coating inevitably contains a certain number of defects or "holidays". If the coating is applied properly, the number and extent of such defects should be quite small. With the usual good coating, at least 90% of the pipe surface will be protected by the coating, thus leaving only 1% or less of exposed pipe surface which is susceptible to galvanic corrosion. Consequently, since the anode surface area provided by the coated strip 12 is at least as great as the total external surface area of the pipe 10, it will be seen that the anodic:cathodic area ratio is on the order of 100:1 or greater. As a result, very effective cathodic protection of the pipe is obtained and the rate of sacrificial corrosion of the less noble metal coating 14 on the strip 12 is held at a low level so that the system has a prolonged field life. Of course, the coating layers 13 and 14 also serve to protect the strip 12 against corrosion in the usual manner.

As mentioned above, the coated strip 12 is under tension so that the pipeline is prestressed thereby strengthening and reinforcing the pipeline and increasing its allowable operating pressure for a given pipe wall thickness or a given yield strength. Alternatively, the coated strip 12 may be under sufficient tension to arrest fracture propagation in the pipeline. Prestressing of the pipeline, may be accomplished by wrapping the strip 12 under initial tension by various means well known in the art. However, a preferred method of prestressing the pipeline is by the use of pressure tensioning in which the strip 12 is wrapped helically around the coated exterior of the pipeline under a nominal tensile stress, e.g. 3000 p.s.i., and thereafter the pipeline is prestressed, prior to its operation at normal pressure, by internally pressurizing the pipeline to a predetermined internal pressure greater than the normal operating pressure and sufficient to exceed the yield strength of the pipe 10 but insufficient to exceed the yield strength of the strip 12. Thus during prestressing, the terminal portion of the deformation of the pipe is plastic, while the deformation of the wrap is entirely elastic. When the pipeline is operated at its normal pressure, all of the pipe portions and wrap of the pipeline deform elastically. As described more fully in the Goodrich et al U.S. Pat. No. 3,880,195, which is incorporated herein by reference, the pressure tensioning method of prestressing the pipeline assures that the stress in the pipe portions and wrap will not exceed certain design values or allowable stresses when the pipeline is operating at normal pressure. Furthermore, a wrapped pipeline that has been prestressed by pressure tensioning is automatically self-compensating for variations in actual yield strength of the pipe portions.

It will be understood that the coating 11 on the pipe 10 is sufficiently strong and deformable to accommodate the tensioned wrap 12 without causing excessive displacement of the coating or otherwise destroying its integrity. The coating 11 is relatively thick, e.g. a single layer enamel coating is usually on the order of 3/32 inch thick, and the mastic coatings may have a thickness of from about ½ to about ⅝ inch. The present invention is particularly advantageous for protecting relatively large diameter pipelines (e.g. 30 inches or greater) intended for operation at high pressures (e.g. 800 p.s.i. or greater). Although the schematic illustration of FIG. 1 shows only a single layer of strip 12 wrapped around the pipe, it will often be desirable to employ multiple layers of wrap for increased strengthening and reinforcement. In such case, if desired, only the outermost layer of wrap may be coated with a less noble metal.

The width, thickness, and number of layers of the strip 12 may be varied to meet the requirements of a given pipeline. Thus, the strip may have a width of from about ½ inch to about 30 inches and a thickness of from about 0.010 inch to about 0.10 inch. In a typical installation the strip may have a width of about 2.875 inches and a thickness of about 0.035 inch. Although not shown in FIG. 1, the strip may be wound so as to provide small gaps between adjacent turns of the helically wound strip. The width of the gaps will vary dependent upon the width of the strip. For example, for strip widths of ½ to 30 inches, the width of the gaps may range from about 0.021 inch to about 1.25 inch. In a typical instance, a strip having a width of 2.875 inches is wound with a lead of about 3 inches to provide gaps of about ⅛ inch between successive turns. The provision of gaps in the wound strip facilitates bending of the pipe. When multiple layers of wrap are used, the turns of the strip in one layer are preferably staggered or off-set from the turns of the next adjacent layer so that the gaps in each layer are covered by the strip material in the next overlying layer.

The material of the strip 12 is preferably a full hard cold rolled steel having a tensile strength of 100,000 p.s.i. or greater and a yield strength greater than the yield strength of the pipe 10. The strip 12 is coated with zinc or aluminum or a zinc alloy or an aluminum alloy by conventional hot-dip coating methods to provide the usual coating weight, e.g. from about 0.2 to about 2.5 oz. per. sq. ft. (both sides) in the case of zinc and from about 0.25 to about 1.0 oz. per sq. ft. (both sides) in the case of aluminum, although lighter or heavier coatings can also be employed where suitable. Other methods of applying the less noble metal coating may also be used, e.g. electrogalvanizing in the case of zinc coatings or zinc alloy coatings or certain aluminum alloy coatings. For optimum effectiveness, anode quality zinc or aluminum or zinc alloy or aluminum alloy having a low iron content should be used, although this is not essential. Also, it is within the scope of the invention to utilize a strip 12 having a less noble metal coating on only one side of the strip, in which case the usual coating weight will be approximately half the values of the aforementioned ranges. If one-side coated strip is used in the FIG. 1 embodiment the coated surface should be the outer surface 14. In addition, differentially coated strip may also be used in which one side has a relatively light weight coating and the other side has a relatively heavy weight coating. In the case of galvanized or zinc alloy coated strip, the strip material may be a high strength plain carbon steel of low carbon content (e.g. 0.03–0.25 wt. % carbon) having a microstructure consisting essentially of tempered martensite as described in McFarland U.S. Pat. No. 3,378,360. A martensitic steel of this type is characterized by a tensile strength of at least about 130,000 p.s.i., preferably from about 150,000 to about 250,000 p.s.i. or higher, and an elongation in 2 inches of from about 1.5% to about 10%.

The strip 12 after being coated with zinc or aluminum or alloys thereof may be subjected to cold reduction or temper rolling in order to increase or restore its tensile strength which is decreased somewhat during hot-dip coating. Cold reduction or temper rolling also has the added advantage, particularly in the case of hot-dip aluminum coated strip, of smoothing out the coating and eliminating pinholes, bare spots, and other coating defects, thereby improving both the continuity and the appearance of the coating.

In the FIG. 1 embodiment, the coating of insulating material 11 provides corrosion protection for the steel pipe 10 in the usual manner, and cathodic protection is provided by the zinc or aluminum or zinc alloy or aluminum alloy coated strip 12-13-14. However, variations of the illustrated arrangement may also be used. For example, in certain instances the coating of insulating material 11 may be omitted entirely, in which case the less noble metal coated strip is wrapped around the bare pipe 10 to provide cathodic protection alone. As a further alternative, in any of the foregoing arrangements the cathodic protection provided by the less noble metal coated strip 12-13-14 may be supplemented by the use of an external current supplied either from an external power source or from a galvanic anode buried in the soil and electrically connected to the pipe or the wrap to protect both the pipe and the less noble metal coating of the wrap.

In FIG. 2 a modification of the invention is shown in which primary cathodic protection is provided by an external power source, and the wrapping of zinc or aluminum or zinc alloy or aluminum alloy coated strip is relied upon as a secondary or back-up corrosion protection system for the pipe. Thus, the pipeline 10 (buried in soil, not shown) has its exterior surface wrapped with the steel coated surfaces 13 and 14. The strip 12 is under tension, as heretofore described, so that the pipeline is prestressed. The coating 11 of electrically insulating material is applied over and adhered to the strip 12. Direct curent is supplied from the negative terminal of an external power source 20 through a conductor 21 to an electrical connection 22 at the exterior coated surface 14 of the strip 12. The circuit is completed by a conductor 23 extending from the positive terminal of the power source 20 to a ground bed 24 buried in the soil and from which current flows through the soil to any exposed areas of the pipe or the strip for protecting the pipe and the strip. Preferably, a conductor 26 also connects the negative terminal of the power source 20 with an electrical connection 27 at the outer surface of the pipe 10. However, if desired, the latter connection may be omitted because of the intimate contact between the pipe and the inner coated surface 14 of the strip 12, in which case the conductor 21 and the connection 22 are relied upon to complete the cathodic protection circuit for both the pipe and the wrap. In either case a high anodic:cathodic area ratio of at least 1:1 is realized, which is substantially greater than can be obtained by conventional systems using buried galvanic anodes or ribbon anodes secured to the pipeline.

In FIG. 2, if one-side coated strip is used, the coated surface should be the inner surface 13 which is in intimate contact with the pipe. In such case, the external power source 20 is connected by the conductor 21 to the outer uncoated surface of the steel strip, thereby protecting both the pipe and the uncoated exterior surface of the wrap. The external power source 20 in FIG. 2 may be any convenient source of direct current, usually a transformer-rectifier in conjunction with an alternating current system or generator. However, a buried galvanic anode may also be used where high potentials are not needed and the soil characteristics are suitable. The voltage requirement will depend upon whether the cathodic protection system is designed to protect the pipe or the strip coating or both. For example, typical galvanic potentials in soil measured with respect to a copper sulfate reference electrode are −1.1 volts for zinc, −0.8 volts for aluminum, and −0.5 to −0.8 volt for mild steel. In general, the external source of power should be designed to maintain the pipeline at a potential of at least −0.85 volt (with respect to a copper sulfate reference electrode), and for certain soil conditions or for protection of the less nobel metal coating on the steel wrapping the potential may be as high as −1.5 volts.

In both the FIG. 1 and FIG. 2 embodiments it will be understood that the electrical connections between the conductors and the pipeline or the strip are made in the usual manner, e.g. by soldering or embedding.

In addition to its application in the construction of new pipelines, the present invention affords particular advantages in reconditioning or upgrading old pipelines. For example, at the present time there exists a considerable amount of bare large diameter pipeline which is 15 to 20 years old and which presently shows, or may be expected to show, a leak frequency that is undesirable because of excessive maintenance costs or safety considerations. By uncovering such a pipeline and wrapping with coated high strength steep strip in accordance with the present invention, both cathodic protection and increased strength are attained in the reconditioned pipeline. In this instance it may be desirable to omit the coating of electrical insulating material shown in FIG. 1, and tensioning of the wrapping will usually be effected by wrapping under high initial tension. Upgrading of old pipelines is necessary in cases of population increases and redistribution. For example, a natural gas pipeline initially installed in a relatively unpopulated Class 1 area may now be in fringe areas near cities and towns and hence may now be in Class 2 locations. Furthermore, because of a population increase, the demand for natural gas may also increase necessitating an increase in the operating pressure of the pipeline. By upgrading the pipeline in accordance with the present invention, the old pipeline can be strengthened and reinforced to meet the new class requirements and operating conditions while at the same time providing enhanced corrosion protection.

I claim:

1. A corrosion protected and prestressed pipeline construction adapted to transmit fluid under high pressure when buried in soil, comprising a ferrous metal pipe having around its exterior surface, in predetermined order, a protective non-metallic coating of electrical insulating material and a wrap comprising at least one layer of high tensile strength ferrous metal strip having a yield strength greater than the yield strength of said pipe, said strip having on at least one of its surfaces a hot-dip or electrolytically deposited metallic coating of a metal less noble than iron, said metallic coating being electrically connected to said pipe for cathodically protecting the pipe, and said strip being under sufficient tension to strengthen and reinforce the pipe or arrest fracture propagation.

2. The construction of claim 1 further characterized in that said less noble metal is selected from the group consisting of zinc, aluminum, zinc alloys and aluminum alloys.

3. The construction of claim 1 further characterized in that said pipe and said strip are steel, and said pipeline is prestressed prior to being operated at a normal pressure by increasing the internal pressure therein to a value sufficient to exceed the yield strength of said pipe but insufficient to exceed the yield strength of said strip.

4. The construction of claim 2, further characterized in that said pipe and said strip are steel, and said pipeline is prestressed prior to being operated at a normal pressure by increasing the internal pressure therein to a value sufficient to exceed the yield strength of said pipe but insufficient to exceed the yield strength of said strip.

5. The construction of claim 1 further characterized in that said strip comprises a steel having a tensile strength of at least 100,000 psi.

6. A corrosion protected and prestressing pipeline construction adapted to transmit fluid under high pressure when buried in soil, comprising:
a ferrous metal pipe; and
at least one layer of high tensile strength ferrous metal strip wrapped around said pipe;
said strip having a yield strength greater than the yield strength of said pipe and being tensioned sufficiently to strengthen and reinforce the pipe or arrest fracture propagation; and
said strip having on at least one of its surfaces a hot-dip or electrolytically deposited metallic coating of a metal less noble than iron, said metallic coating being electrically connected to said pipe for cathodically protecting the pipe.

7. The construction of claim 6 further characterized in that said noble metal is selected from the group consisting of zinc, aluminum, zinc alloys and aluminum alloys.

8. The construction of claim 6 further characterized in that said strip comprises a steel having a tensile strength of at least 100,000 psi.

9. A corrosion protected and prestressed pipeline construction adapted to transmit fluid under high pressure when buried in soil, comprising:
a ferrous metal pipe;
a protective non-metallic coating of electrical insulating material adhered to the exterior surface of said pipe; and
at least one layer of high tensile strength ferrous metal strip wrapped around said non-metallic coating;
said strip having a yield strength greater than the yield strength of said pipe and being tensioned sufficiently to strengthen and reinforcing the pipe or arrest fracture propagation; and
said strip having on at least one of its surfaces a hot-dip or electrolytically deposited metallic coating of a metal less noble than iron, said metallic coating being elecrically connected to said pipe for cathodically protecting the pipe.

10. The construction of claim 9 further characterized in that said less noble metal is selected from the group consisting of zinc, aluminum, zinc alloys, and aluminum alloys.

11. The construction of claim 9 further characterized in that said pipe is steel and said strip is galvanized steel having both sides coated with zinc, and an electrical conductor extends between said pipe and at least the outer zinc coated surface of said strip.

12. The construction of claim 9 further characterized in that said pipe is steel and said strip is galvanized steel having only its outer side coated with zinc, and an electrical conductor extends between said pipe and the zinc coating at the outer side of said strip.

13. The construction of claim 9 further characterized in that said strip comprises a steel having a tensile strength of at least 100,000 psi.

14. A corrosion protected and prestressed pipeline construction adapted to transmit fluid under high pressure when buried in soil, comprising:
a ferrous metal pipe;
at least one layer of high tensile strength ferrous metal strip wrapped in contact with and around the exterior surface of said pipe;
said strip having a yield strength greater than the yield strength of said pipe and being tensioned sufficiently to strengthen and reinforce the pipe or arrest fracture propagation;
said strip having on at least one of its surfaces a hot-dip or electrolytically deposited metallic coating of a metal less noble than iron, said metallic coating being electrically connected to said pipe for cathodically protecting the pipe;
a protective non-metallic coating of electrical insulating material adhered to the exterior of the wrapped strip; and
means connected to the outer surface of said strip for supplying an electric current thereto and cathodically protecting said pipe and said strip.

15. The construction of claim 14 further characterized in that said less noble metal is selected from the group consisting of zinc, aluminum, zinc alloys, and aluminum alloys.

16. The construction of claim 14 further characterized in that said means comprises an electric power source having a negative terminal connected to the outer surface of said strip and a positive terminal connected to a ground bed.

17. The construction of claim 16 further characterized in that said negative terminal is also connected to said pipe.

18. The construction of claim 14 further characterized in that said pipe is steel and said strip is galvanized steel having both sides coated with zinc, and said means is connected to the outer zinc coated surface of said strip.

19. The construction of claim 14 further characterized in that said pipe is steel and said strip is galvanized steel having only its inner surface coated with zinc, and said means is connected to the outer uncoated surface of said strip.

20. The construction of claim 14 further characterized in that said strip comprises a steel having a tensile strength of at least 100,000 psi.

* * * * *

UNITED STATES PATENT OFFICE
CERTIFICATE OF CORRECTION

PATENT NO. : 3,990,478
DATED : November 9, 1976
INVENTOR(S) : William H. McFarland It is certified that error appears in the above-identified patent and that said Letters Patent are hereby corrected as shown below:

Column 3, line 15, "90%" should read --99%--.

Column 5, line 38, after "steel" insert --strip 12 having zinc or aluminum or zinc alloy or aluminum alloy--;

line 56, "14" should read --13--.

Column 7, line 41, "said noble metal" should read --said less noble metal--;

line 59, "reinforcing" should read --reinforce--

Signed and Sealed this

Twenty-second Day of March 1977

[SEAL]

Attest:

RUTH C. MASON
*Attesting Officer*

C. MARSHALL DANN
*Commissioner of Patents and Trademarks*